United States Patent
Khan et al.

(10) Patent No.: US 11,425,247 B1
(45) Date of Patent: Aug. 23, 2022

(54) METHODS AND SYSTEMS FOR REDUCING RESOURCE USAGE FOR CALL ORIGINATIONS

(71) Applicant: Verizon Patent and Licensing Inc., Basking Ridge, NJ (US)

(72) Inventors: Kashif Khan, Keller, TX (US); Danysel Barthelme, Frisco, TX (US); Ronald E. Collier, II, Arlington, TX (US); Ertao Li, Plano, TX (US); Steve L. Padilla, Lewisville, TX (US); Gaurav M. Patel, McKinney, TX (US); Shawn R. Pugh, Easton, PA (US); Shujaat Ali Siddique, Hillsborough, NJ (US); Daniel L. Walker, Wall, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/173,570

(22) Filed: Feb. 11, 2021

(51) Int. Cl.
*H04M 3/493* (2006.01)
*H04M 3/42* (2006.01)

(52) U.S. Cl.
CPC ....... *H04M 3/493* (2013.01); *H04M 3/42025* (2013.01); *H04M 3/42212* (2013.01)

(58) Field of Classification Search
CPC ............ H04M 3/493; H04M 3/42025; H04M 3/42212
USPC ..... 379/218.01; 370/351–357; 709/201–207, 709/217–248
See application file for complete search history.

(56) References Cited

U.S. PATENT DOCUMENTS

| | | | | |
|---|---|---|---|---|
| 5,907,602 A * | 5/1999 | Peel | ...................... | H04M 15/00 379/114.14 |
| 6,038,440 A * | 3/2000 | Wu | ...................... | H04W 12/126 455/410 |
| 6,094,681 A * | 7/2000 | Shaffer | .................. | G06Q 10/10 709/206 |
| 6,330,317 B1 * | 12/2001 | Garfinkel | .............. | H04M 3/436 379/900 |
| 6,404,871 B1 * | 6/2002 | Springer | ............... | H04M 1/677 379/144.01 |
| 7,606,556 B2 * | 10/2009 | Poikselka | ............... | H04W 4/02 455/404.2 |
| 9,014,353 B1 * | 4/2015 | Davis | .................... | H04M 3/367 379/112.01 |
| 2007/0143422 A1 * | 6/2007 | Cai | ........................ | H04M 3/436 709/206 |
| 2008/0037529 A1 * | 2/2008 | Bangalore | ......... | H04M 3/42017 370/354 |
| 2009/0279532 A1 * | 11/2009 | Perna | ...................... | H04M 3/22 370/352 |
| 2009/0290695 A1 * | 11/2009 | Schulzrinne | ...... | H04L 29/08072 379/93.02 |
| 2010/0112986 A1 * | 5/2010 | Ellingham | .............. | H04M 3/16 455/414.1 |

(Continued)

*Primary Examiner* — Hemant S Patel (57) ABSTRACT

A method may include determining that a digit pattern has been input on a user device to initiate a call; transmitting the digit pattern to a device that stores a list of digit patterns to which calls are not to be completed; receiving, from the device, data that indicates whether the digit pattern is on the list of digit patterns; prohibiting the call from being initiated with a network when the data indicates that the digit pattern is on the list of digit patterns; and initiating the call with the network when the data indicates that the digit pattern is not on the list of digit patterns.

20 Claims, 9 Drawing Sheets

(56) References Cited

U.S. PATENT DOCUMENTS

2011/0151850 A1* 6/2011 Haaparanta ......... H04M 1/2745
455/415
2011/0280386 A1* 11/2011 Fotta ....................... H04L 51/12
379/196

* cited by examiner

| MCC | MNC | DIALED DIGITS | STATUS | ACTION |
|---|---|---|---|---|
| 311 | 480 | 2045551212 | BLOCKED | PLAY ANNOUNCEMENT #1 |
| 311 | 480 | 1045551212 | INVALID | PLAY ANNOUNCEMENT #2 |
| 311 | 480 | 500XXXXXXX | INVALID | PLAY ANNOUNCEMENT #2 |
| ... | ... | ... | ... | ... |
| 310 | 200 | 4447895454 | FRAUD | PLAY ANNOUNCEMENT #3 |

FIG. 5

| Announcement # | Message |
|---|---|
| 1 | We're sorry; we are unable to complete your call as dialed. Please check the number and dial again, or call your operator to help you. |
| 2 | We're sorry, you have dialed a number which cannot be reached from your calling area. |
| 3 | Dial the 10-digit number (area code plus the number), then try again. |
| 4 | The number you have dialed has been disconnected. No further information is available about this number. |

METHODS AND SYSTEMS FOR REDUCING RESOURCE USAGE FOR CALL ORIGINATIONS

BACKGROUND INFORMATION

When a user dials a number to originate a call, the user device sends a request to a provider network and the provider network processes the request using multiple network devices. When the dialed number is invalid or unavailable, the provider network processes the request and returns an indication that the dialed number is invalid or unavailable. With the current method, network resources are wasted for calls that are not successful.

DETAILED DESCRIPTION OF PREFERRED EMBODIMENTS

The following detailed description refers to the accompanying drawings. The same reference numbers in different drawings identify the same or similar elements.

With current network configurations, when a user places a call using a user device, the user may dial a phone number and, using the Session Initiation Protocol (SIP), the user device transmits a request over a telecommunications provider's network to an endpoint. For example, when a user device initiates a call, the user device may send a SIP INVITE message to the Internet Protocol (IP) Multimedia Subsystem (IMS) core devices in the provider network, which may forward the request to a Telephony Application Server (TAS) to execute originating services for the user device. If the TAS determines that the call is not valid (i.e., the number is not valid, the number is blocked, the calling device is disconnected, etc.), the TAS may invoke a media resource function (MRF) and the MRF may determine an appropriate recording to play at the user device to indicate that the originating call cannot be completed. The recording may be forwarded to the user device via the IMS core devices and via Evolved Packet Core (EPC) devices associated with the service provider.

The current method may require the use of network resources and validation checks against the network to allow the customer to attempt to originate the call. When the dialed number is unavailable or invalid, network resources (e.g., radio frequency (RF) resources, transport resources, media resources) may unnecessarily be tied up for a call that cannot be completed. If the network resources were not used for unsuccessful call originations, the network resources may be utilized for true call originations or for other network functions. In addition, a service provider may be able to better plan for needed resources because fewer resources would be consumed with unsuccessful calls.

Systems and methods described herein reduce the amount of network resources utilized for unsuccessful calls by performing a check to determine whether a dialed number is on a list of invalid numbers before utilizing network resources for originating the call using the dialed number. In one implementation, after a phone number has been dialed, a user device may initiate an Application Programming Interface (API) query including the dialed number to an application server, which may be located outside of a provider network. The application server may check the received dialed number against a database of dialed digit numbers or patterns and respond to the user device with a status and action response.

In one implementation, if the status indicates that the dialed number is not in the database of digit patterns, the user device may allow the call using the dialed digits to continue using provider network resources. In another implementation, if the status indicates that the dialed number is in the database of digit patterns, the user device may prohibit the dialed phone call from proceeding. In addition, if the status indicates that the dialed number is in the database of digit patterns, the application server may additionally indicate an announcement to be played to a user of the user device. The announcement may be stored on the user device.

Figure 1:
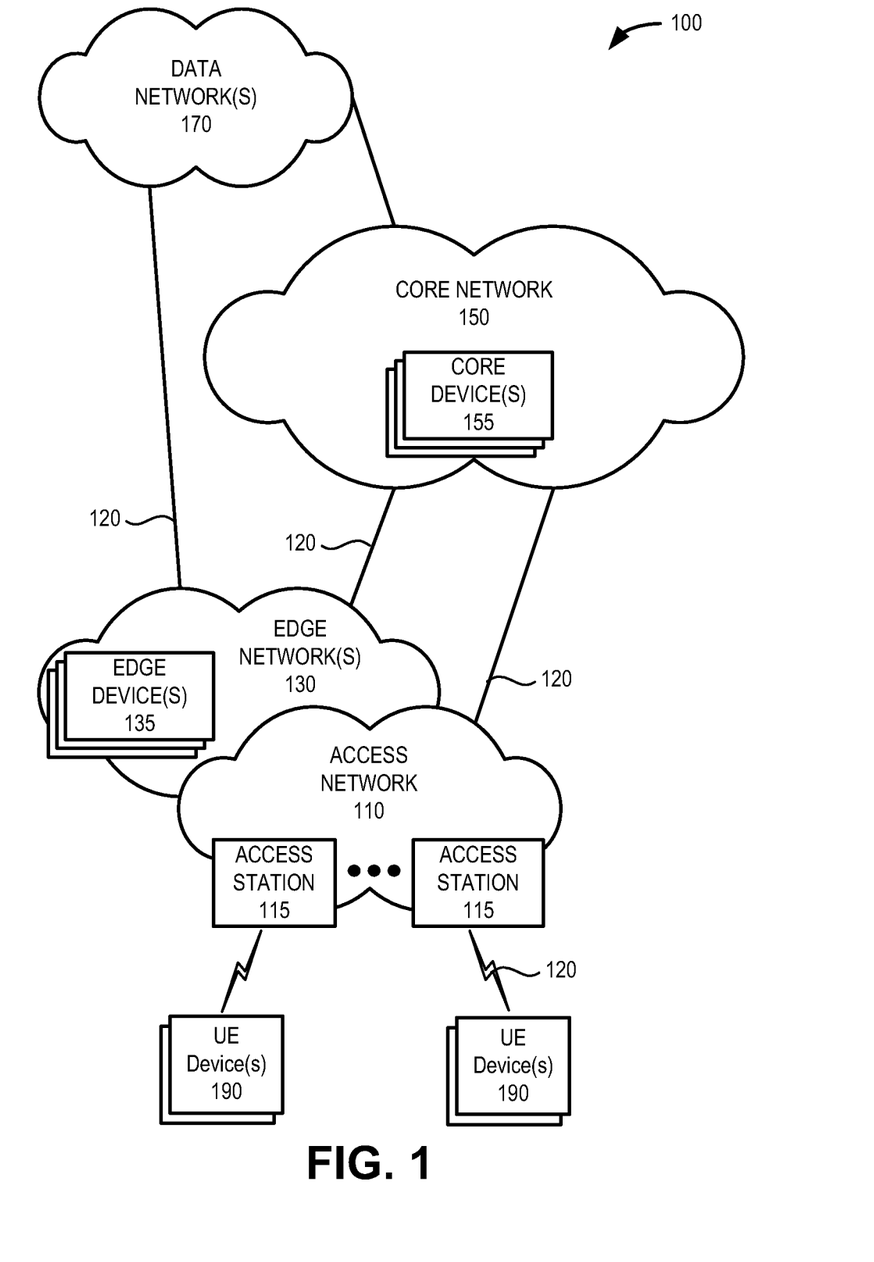
FIG. 1 is a diagram illustrating a network environment according to an implementation described herein.

FIG. 1 is a diagram illustrating an exemplary environment 100 in which an exemplary embodiment of performing a check of dialed digits using a dialed digit filter may be implemented. As illustrated, environment 100 includes an access network 110, edge networks 130, a core network 150, and one or more data networks 170. Access network 110 includes access stations 115, edge network 130 includes edge devices 135, and core network 150 includes core devices 155. Environment 100 further includes user equipment (UE) devices 190.

The number, the type, and the arrangement of network devices and the number of UE devices 190 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 110 may include one or multiple networks of one or multiple types and technologies. For example, access network 110 may include a Fifth Generation (5G) radio access network (RAN), Fourth Generation (4G) RAN, and/or another type of future generation RAN. By way of further example, access network 110 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 110 may further include other types of wireless networks, such as a WiFi network, a Worldwide Interoperability for Microwave Access (WiMAX) network, a local area network (LAN), or another type of network that may provide an on-ramp to access stations 115 and/or core network 150.

Depending on the implementation, access network 110 may include one or multiple types of access stations 115. For example, access station 115 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 110 may be implemented according to various wireless technologies (e.g., radio access technology (RAT), etc.), wireless standards, wireless frequencies/bands, and so forth. According to an implementation, access stations 115 may include a gNB with multiple distributed components, such as a central unit (CU), a distributed unit (DU), a remote unit (RU or a remote radio unit (RRU)), or another type of distributed arrangement. Access stations 115 (as part of access network 110) may be part of a Self-Organizing Network (SON) that may be reconfigured by another component in networks 110, 130, and/or 150.

Edge network 130 includes a platform that provides application services at the edge of a network, such as application services for UE devices 190. For example, edge network 130 may be implemented as a Multi-access Edge Compute (MEC) platform. Edge network 130 may be implemented using one or multiple technologies including, for example, network function virtualization (NFV), software defined networking (SDN), cloud computing, or another type of network technology. Edge network 130 may include network devices (e.g., edge devices 135) located to provide geographic proximity to various groups of access stations 115. In some embodiments, components of edge network 130 may be co-located with access station 115 in access network 110. In other embodiments, access stations 115 may connect to edge network 130 via wired (e.g., optical) backhaul links 120.

Core network 150 may include one or multiple networks of one or multiple types and technologies. According to an exemplary embodiment, core network 150 includes a complementary network associated with access network 110. For example, core network 150 may be implemented to include a next generation core (NGC) for a 5G network. In other implementations, core network 150 may also include an EPC of an LTE, a core network of an LTE-Advanced (LTE-A) network, and/or a core network of an LTE-A Pro network. Core network 150 may also include a legacy core network.

Depending on the implementation, core network 150 may include various types of network devices, such as core devices 155. For example, core devices 155 may include 5G core components and/or combined 4G/5G core components, such as a packet gateway (PGW), a serving gateway (SGW), a home subscriber server (HSS), an authentication, authorization, and accounting (AAA) server, a policy charging and rules function (PCRF), a charging system (CS), a user plane function (UPF), an Access and Mobility Management Function (AMF), a mobility and management entity (MME), a session management function (SMF), a unified data management (UDM) device, an authentication server function (AUSF), a network slice selection function (NSSF), a network repository function (NRF), a Policy Control Function (PCF), a network exposure function (NEF), and/or an application function (AF). According to other exemplary implementations, core devices 155 may include additional, different, and/or fewer network devices than those described. For example, core devices 155 may include a non-standard and/or proprietary network device.

Data network 170 may include one or multiple networks. For example, data network 170 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 170 may include various network devices that provide various applications, services, or other type of UE device assets (e.g., servers (e.g., web, application, cloud, etc.), mass storage devices, data center devices), and/or other types of network services pertaining to various network-related functions. In one implementation, data network 170 may include a dialed digit filter and a dialed digit database that stores patterns of dialed digits that are invalid, unavailable, or otherwise may be prohibited from being dialed from an originating device.

UE devices 190 may each include a mobile device, such as wireless or cellular telephone device (e.g., a conventional cell phone with data processing capabilities), a smart phone, a personal digital assistant (PDA) that can include a radiotelephone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc., that is capable of placing a call using dialed digits. In other implementations, UE devices 190 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 190 may connect to access stations 115 in a wireless manner and place calls using dialed digits. As described further herein, UE device 190 may access a dialed digit filter prior to utilizing network resources to place a call using dialed digits to determine whether the call may proceed.

Although FIG. 1 shows exemplary components of environment 100, in other implementations, environment 100 may include fewer components, different components, differently arranged components, or additional functional components than depicted in FIG. 1. For example, in one implementation, environment 100 may include a MEC network that provides applications and services at the edge of a network. Additionally or alternatively, one or more components of environment 100 may perform functions described as being performed by one or more other components of environment 100.

Figure 2:
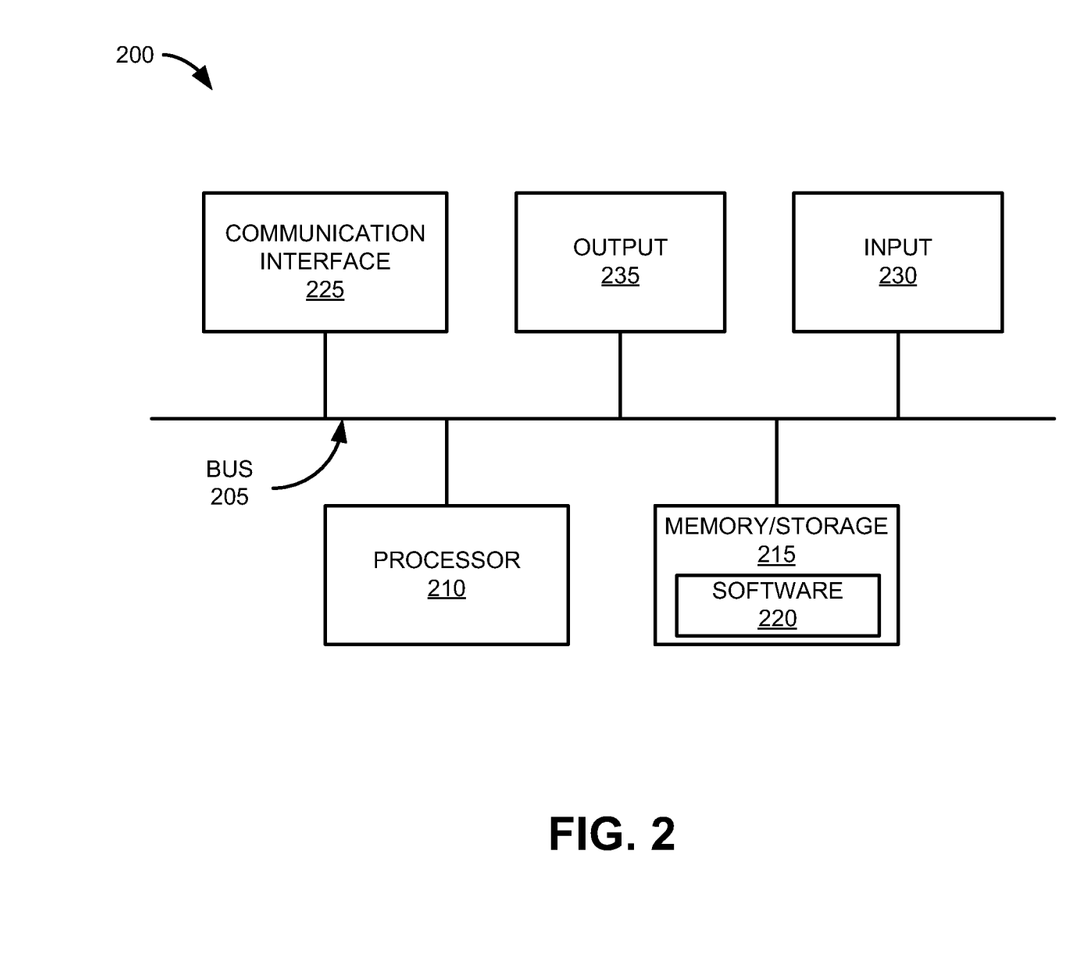
FIG. 2 is a diagram of exemplary components that may be included in one or more of the devices shown in FIG. 1.

FIG. 2 is a diagram illustrating exemplary components of a device 200 that may correspond to one or more of the devices described herein. For example, device 200 may correspond to components included in UE device 190, access station 115, edge devices 135, core devices 155, and/or other components of access network 110, edge network 130, core network 150, and/or data network 170, such as a dialed digit filter. As illustrated in FIG. 2, according to an exemplary embodiment, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction. Additionally, for example, a 5G UE device 190 may include logic to perform tasks, as described herein, based on software 220.

Communication interface 225 permits device 200 to communicate with other devices, networks, systems, devices, and/or the like. Communication interface 225 includes one or multiple radio frequency (RF) wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a keypad, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
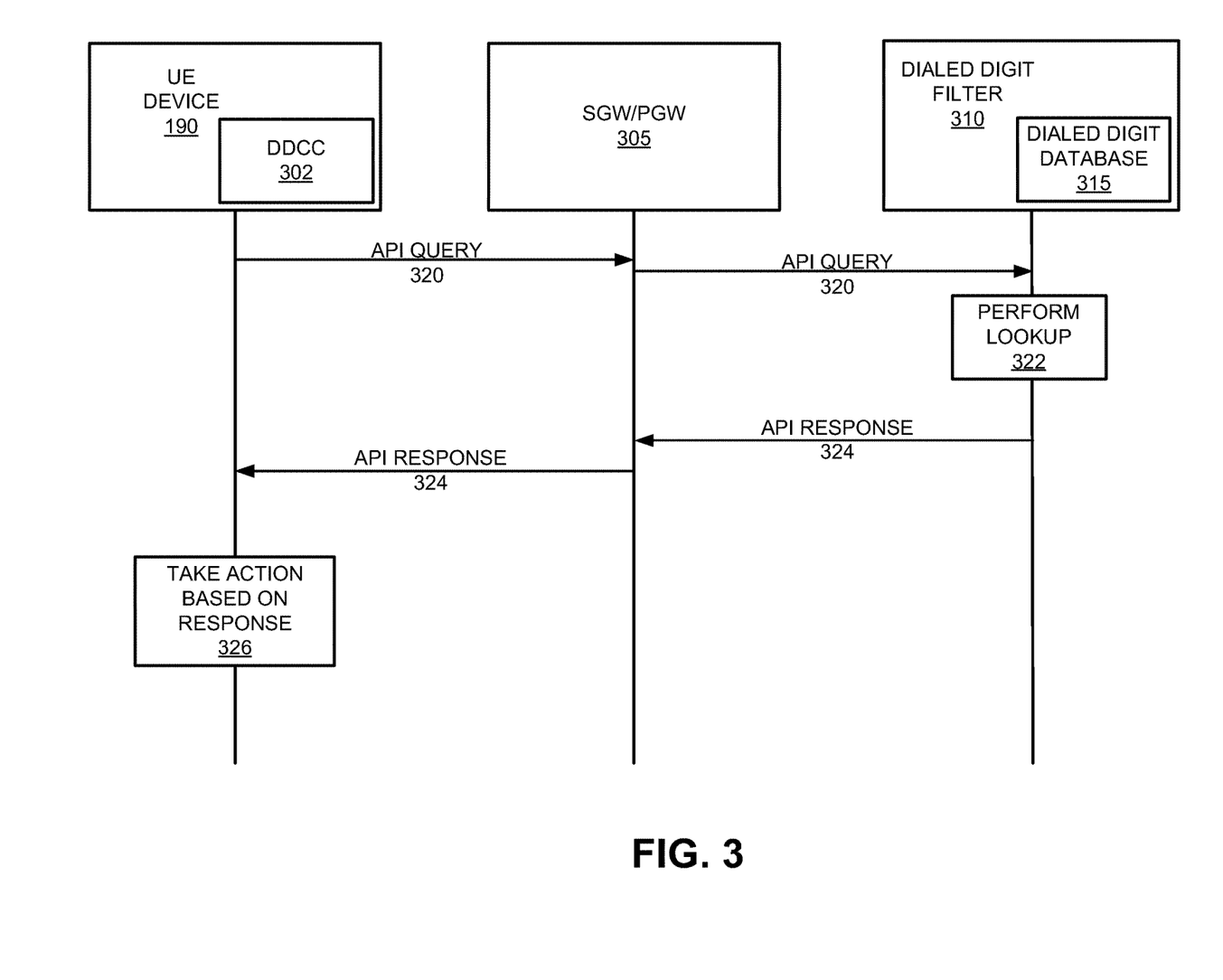
FIG. 3 is a diagram illustrating exemplary communications for accessing a dialed digit filter to determine whether to proceed with a call, according to an implementation described herein.

FIG. 3 is a diagram illustrating exemplary communications for accessing a dialed digit filter to determine whether to proceed with a call originated at UE device 190. FIG. 3 includes UE device 190, Serving Gateway (SGW)/Packet Data Network Gateway (PGW) 305, and dialed digit filter 310. In other implementations, 5G functions may be used.

Communications shown in FIG. 3 provide simplified illustrations of communications and are not intended to reflect every signal or communication exchanged between devices. Furthermore, additional information not described herein may be communicated with some signals or communications. Additional devices not shown in FIG. 3 may receive and/or transmit some signals or communications not described herein.

UE device 190 may include a user device capable of placing a call using dialed digits. In addition, UE device 190 may include a Dialed Digit Converted Client (DDCC) 302 to determine when a digit pattern has been dialed and transmit the dialed digit pattern to dialed digit filter 310. DDCC 302 may be a client or client application stored on UE device 190 by a carrier or provider associated with UE device 190 if the carrier or provider opts in to use the services provided by dialed digit filter 310. SGW/PGW 305 may be included in an EPC of a provider network. SGW/PGW 305 may provide a gateway for transmitting data and messages to and from dialed digit filter 310, which may be located outside the provider network. Dialed digit filter 310 may include a dialed digit database 315 that stores patterns of digits that correspond to unavailable, invalid, blocked, or fraudulent numbers or numbers to which UE device 190 may be prohibited from calling for another reason.

UE device 190 may dial a series of digits (e.g., a telephone number) in an attempt to originate a call. DDCC 302 may determine that UE device 190 is attempting to originate a call using the dialed digits. As shown in FIG. 3, UE device 190 may send API query 320 to dialed digit filter database 310 via SGW/PGW 305. For example, UE device 190 may transmit an HTTP GET query to dialed digit filter 310 including the dialed digit pattern. Dialed digit filter 310 may receive API query 320 and may perform a lookup to determine whether the dialed digits received in API query 320 are in the dialed digit database 315 (322). For example, dialed digit filter 310 may extract the dialed digits included in API query 320 and may determine whether matching dialed digits (e.g., a matching telephone number) are found in dialed digit database 315.

Dialed digit filter 310 may transmit API response 324 to UE device 190 via SGW/PGW 305. For example, dialed digit filter 310 may transmit an HTTP GET response to UE device 190. API response 324 may include a status and action response associated with the dialed digits. For example, API response 324 may indicate whether the dialed digits were identified in dialed digit database 315. API response 324 may also include additional instructions on how to proceed based on the status. For example, API response 324 may include an indication of an announcement for UE device 190 to play if API response 324 indicates that the dialed digits were identified in dialed digit database 315. For example, UE device 190 may store a series of announcements including indications of reasons why a call to the dialed digits may be prohibited (e.g., the dialed digits are invalid, blocked, fraudulent, etc.). In one implementation, API response 324 may include an identifier of the announcement that may be played by UE device 190 when the dialed digits are identified in dialed digit database 315.

UE device 190 may receive API response 324 and may take action depending on the received response (326). In one implementation, if API response 324 indicates that the dialed digits are not in dialed digit database 315, UE device 190 may proceed with originating the call. In another implementation, if the dialed digits are in dialed digit database 315, UE device 190 may prohibit the call from proceeding. In addition, UE device 190 may play an announcement indicated by API response 324 to inform a user of a reason why the call may not proceed and possible steps to take.

The communications described with respect to FIG. 3 decrease an amount of unsupported call originations (e.g., calls that may be invalid, blocked, etc.) from tying up resources on a provider's network. Since dialed digit filter 310 may be located outside of the provider's network, UE device 190 may determine that a call should be prohibited prior to utilizing resources on a provider's network. In this way, provider resources may be available to use for supported call originations and for other data sessions.

Figure 4:
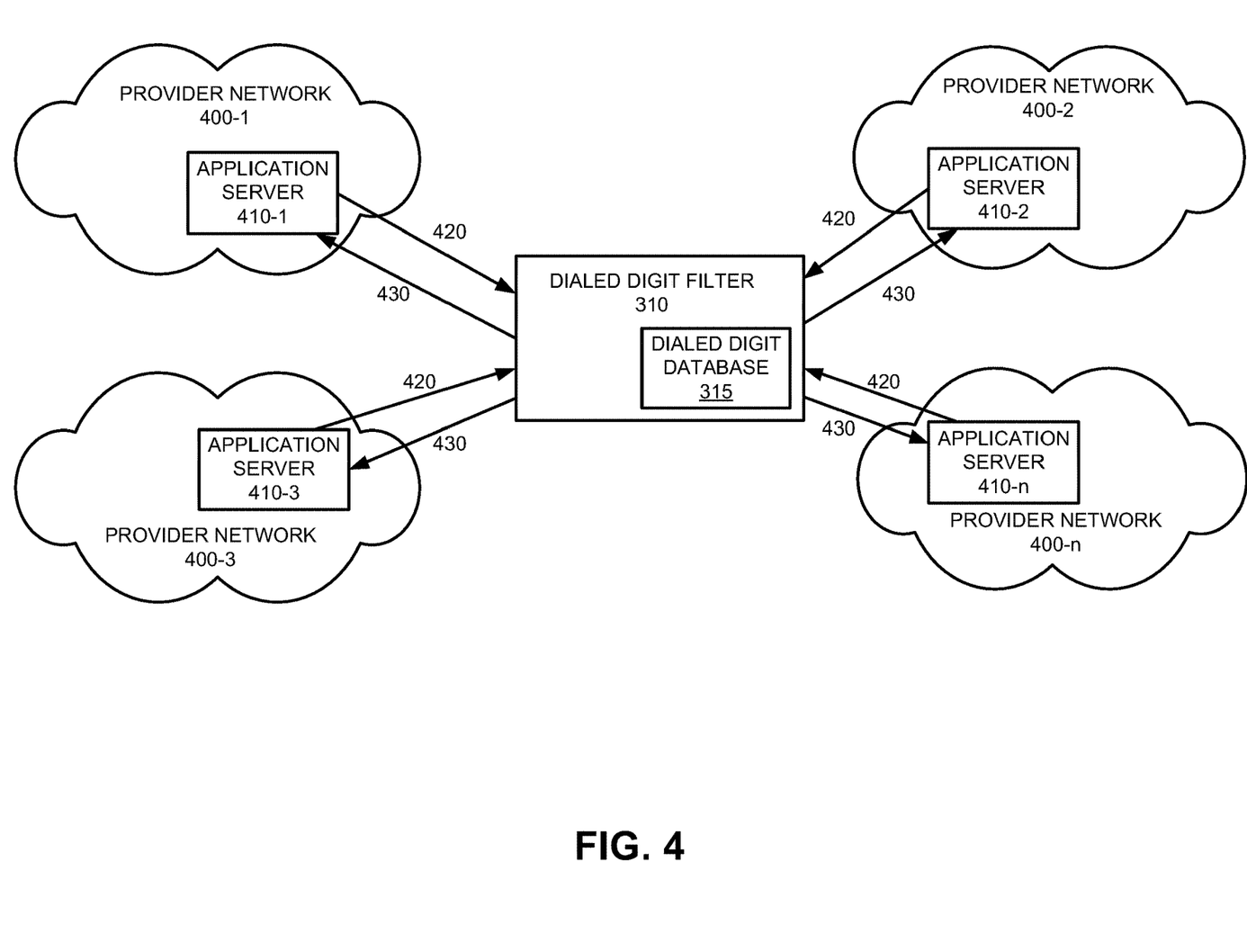
FIG. 4 is a diagram illustrating an exemplary process for populating a dialed digit database, according to an implementation described herein.

FIG. 4 is a diagram illustrating an exemplary process for populating dialed digit database 315. FIG. 4 may include provider networks 400-1 to 400-*n* (referred to in the singular as provider network 400 and in the plural as provider networks 400) and dialed digit filter 310. Each provider network may include an application server 410, illustrated as application servers 410-1 to 410-*n* (referred to in the singular as application server 410 and in the plural as application servers 410).

Each provider network may correspond to a network associated with a different telecommunications provider, operator, or carrier. As described above, dialed digit filter 310 may be located outside of a provider's network. In such cases, a single dialed digit filter 310 may be used by multiple service providers. Therefore, as shown in FIG. 4, each provider network 400-1 to 400-*n* may "opt in" to utilize the dialed digit services and each provider network 400-1 to 400-*n* may interact with dialed digit filter 310 to determine whether to proceed with a call origination using dialed digits. In addition, each provider network 400-1 to 400-*n* may interact with dialed digit filter 310 to update dialed digit database 315. In one implementation, dialed digit database 315 may be maintained individually by each provider network 400-1 to 400-*n*, so if dialed digits are not valid for a particular provider network (e.g., provider network 400-1), the dialed digits may be valid for a different provider network (e.g., provider network 400-2). If a provider network 400 opts in to utilize services provided by dialed digit filter 310, the provider network may maintain the dialed digit database separately.

As shown in FIG. 4, application server 410 of operator network 400 may transmit message 420 to dialed digit filter 310 including a dialed digit pattern to be stored at dialed digit database 315. For example, operator network 400 may transmit an HTTP POST message to dialed digit filter 310 with an extensible markup language (XML) containing a dialed digit pattern to add to dialed digit database 315. In one implementation, message 420 may additionally indicate a status of the dialed digit pattern and an action associated with the dialed digit pattern. In one implementation, translation table updates to dialed digit database 315 may be made in real time when changes are made on each provider network 400.

When dialed digit filter 310 receives messages 420 from provider networks 400, dialed digit filter 310 may populate dialed digit database 315 with the received dialed digit patterns. In one implementation, the dialed digits may be stored separately based on provider network 400. For example, a dialed digit pattern received from network provider 400-1 may be stored separately from a dialed digit pattern received from provider network 400-2. As another example, each dialed digit stored in dialed digit database 315 may indicate a corresponding provider network 400. When dialed digit filter 310 completes the update of dialed digit database 315, dialed digit filter 310 may transmit message 430 to provider network 400 indicating that the update has been completed and dialed digit database 315 has been populated with the received dialed digit. In one implementation, message 430 may include an HTTP POST 200 OK message.

Figure 5:
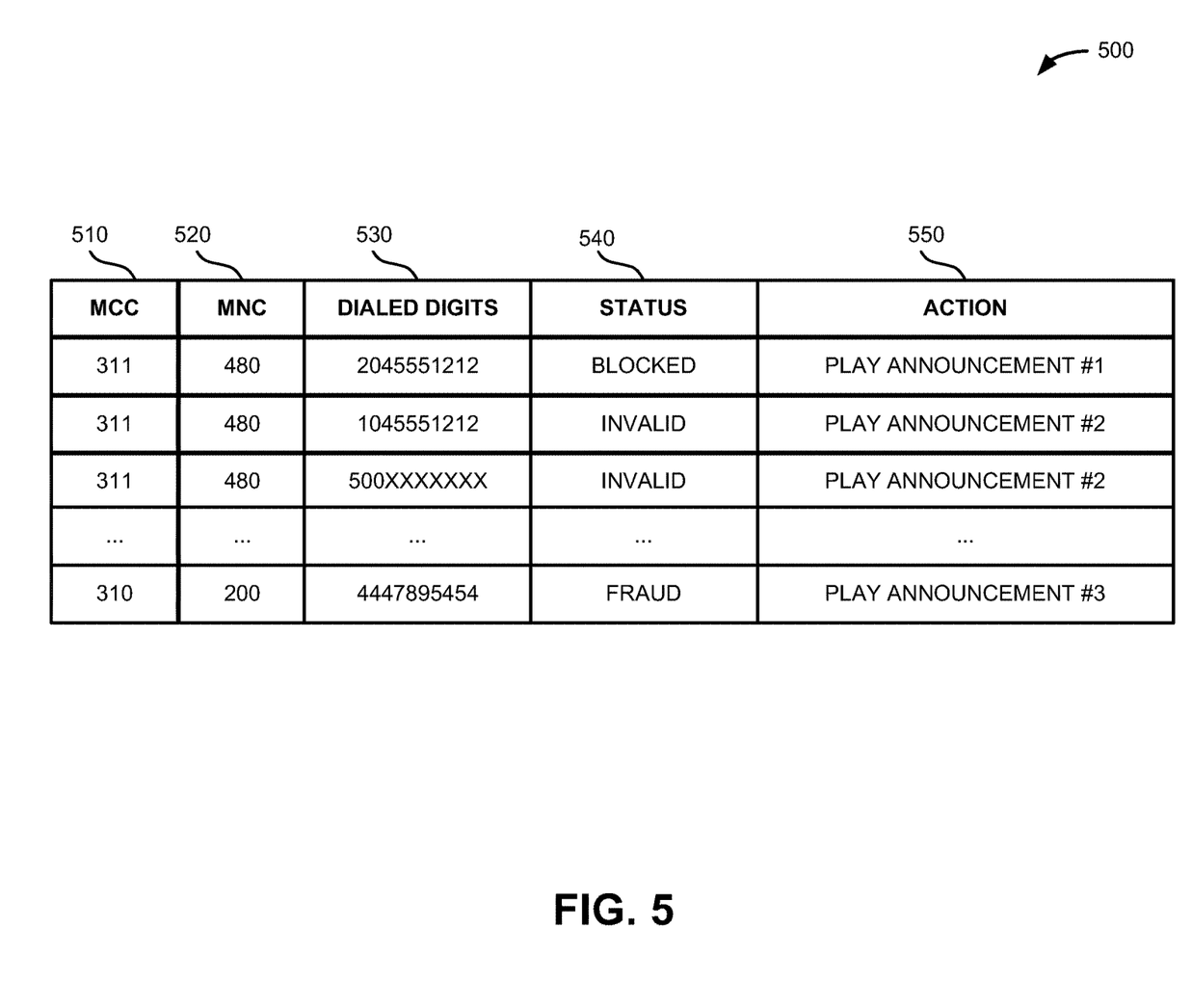
FIG. 5 is diagram illustrating an exemplary table corresponding to a dialed digit database, according to an implementation described herein.

FIG. 5 is diagram illustrating an exemplary table 500 corresponding to dialed digit database 315. Table 500 may include a mobile country code (MCC) field 510, a mobile network code (MNC) field 520, a dialed digits field 530, a status field 540, and an action field 550.

MCC field 510 may indicate a country code associated with dialed digits and MNC field 520 may indicate a mobile network associated with the dialed digits. An MCC in combination with an MNC may uniquely identify each provider network 400. Dialed digits field 530 may identify the digits input by UE device 190 to place the originating call.

Status field 540 may indicate a reason that the originating call with the dialed digits may not proceed. For example, as shown in FIG. 5, status field 540 may indicate that the dialed digit pattern is blocked, invalid, fraudulent, etc. Action field 550 may indicate an action to perform when the dialed digit pattern is in dialed digit database 315. In one implementation, action field 550 may indicate which announcement is to be played by UE device 190 based on the status of the dialed digits in status field 540. For example, as shown in FIG. 5, if UE device 190 dials digit pattern 2045551212 with MCC 311 and MNC 480, dialed digit filter 310 may determine that the dialed digit pattern corresponds to a blocked number and may instruct UE device 190 to play announcement #1.

Figure 6:
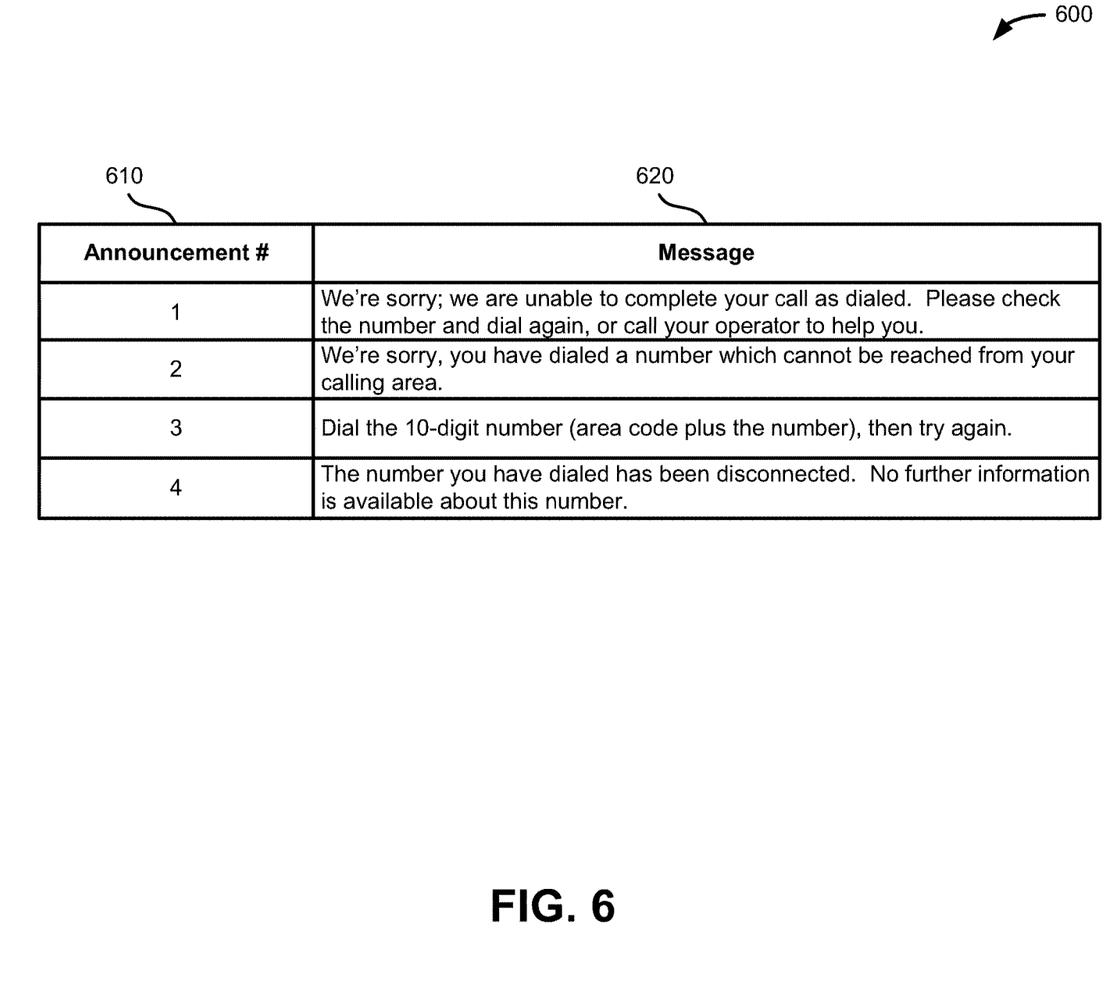
FIG. 6 is a diagram illustrating a table of exemplary announcements that may be played by a user device based on a status of dialed digits.

FIG. 6 illustrates a table 600 of exemplary announcements that may be played by UE device 190 based on the status of a dialed digit pattern in status field 540. As shown in FIG. 6, table 600 may include an announcement number field 610 and a message field 620. Table 600 may be stored at UE device 190 as part of downloading of DDCC 302.

Announcement number field 610 may include announcement numbers that correspond to the announcements indicated in action field 550 of FIG. 5. Message field 620 may indicate the message that corresponds to the announcement number. In one implementation, the message may be based on a status of the dialed number determined in status field 540. For example, a different message may be played based on whether the dialed digit pattern is blocked, unavailable, disconnected, etc. UE device 190 may store the messages locally and when UE device 190 receives an indication of which message number to play from dialed digit filter 310, UE device 190 may play the message corresponding to the message number.

For example, as shown in FIG. 6, if UE device 190 is instructed by dialed digit filter 310 to play announcement #1 (e.g., if UE device 190 dials digit pattern 2045551212 with MCC 311 and MNC 480, in the example given above), UE device 190 may play a message that says "We're sorry; we are unable to complete your call as dialed. Please check the number and dial again, or call your operator to help you."

Figure 7:
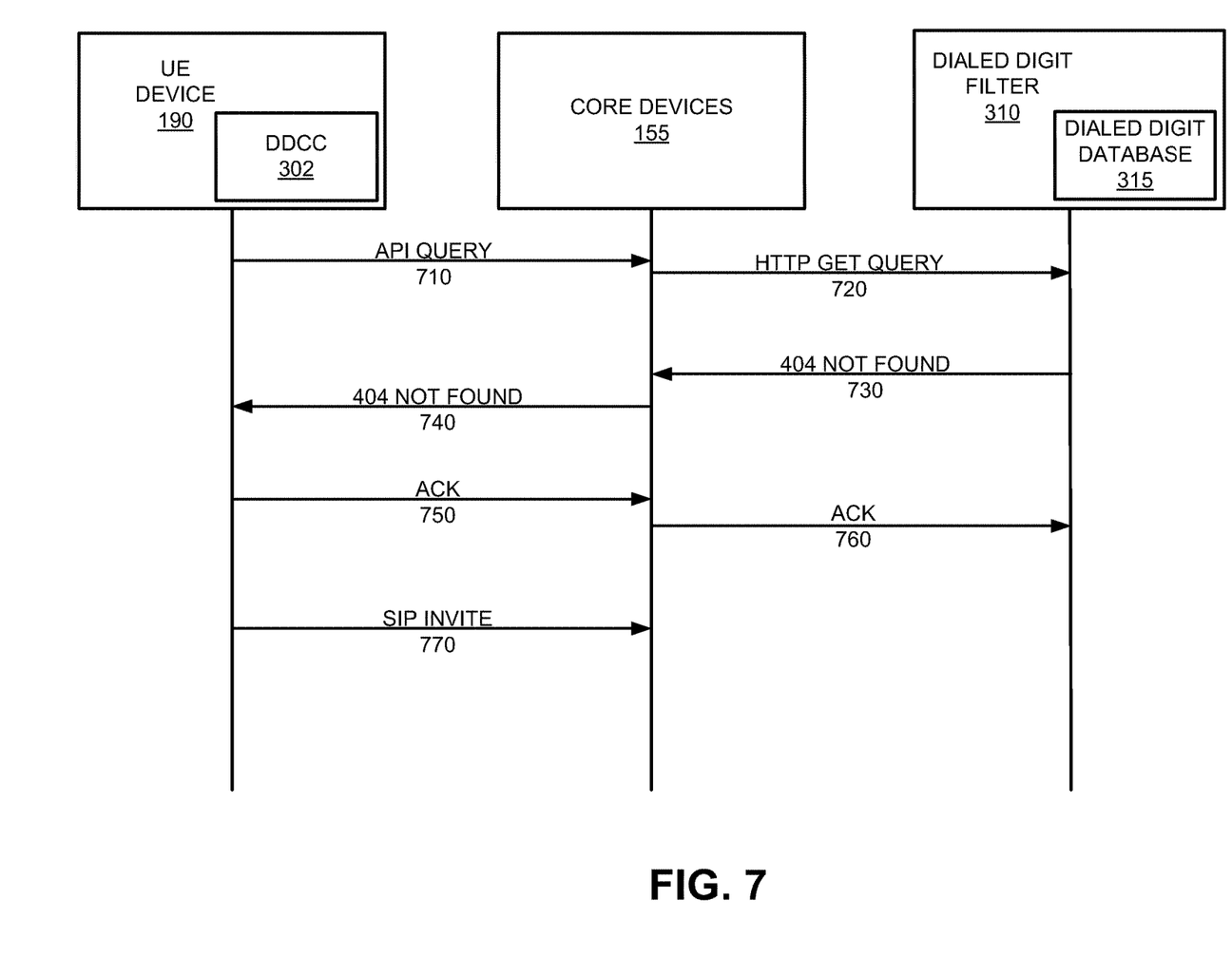
FIG. 7 is a diagram illustrating exemplary communications for proceeding with a call based on determining dialed digits are not in a dialed digit database, according to an implementation described herein.

FIG. 7 is a diagram illustrating exemplary communications for proceeding with a call based on determining a dialed digit is not in dialed digit database 315. FIG. 7 may include UE device 190, core devices 155, and dialed digit filter 310.

As shown in FIG. 7, UE device 190 may initiate a call using a dialed digit pattern and DDCC 302 on UE device 190 may intercept the dialed digits before the call proceeds to the network. In one implementation, DDCC 302 may intercept the dialed digits when UE device 190 determines that the call is not an emergency call (i.e., the dialed digits are not 911 or another pattern corresponding to an emergency number). If the call is not an emergency call, DDCC 302 on UE device 190 may begin a client timer and transmit API query 710 via a data connection to core devices 155. Core devices 155 may include devices in the EPC and may provide a gateway for transmitting data and messages to and from dialed digit filter 310. In one implementation, API query 710 may be an HTTP GET query that includes the MCC and MNC associated with UE device 190. The HTTP GET query may request a status and action associated with the dialed digits. For example, the HTTP GET query for dialed digit pattern 4694781234 from MCC 311 and MNC 480 may look like:

https:api.dialeddigitfilter.com/phone/
client_id=xxxxx&client_secret=yyyyy/status?action?dialed digit=4694781234&MCCMNC=311480.

Core devices 155 may receive API query 710 and forward the HTTP GET query to dialed digit filter 310 (720). Dialed digit filter 310 may receive the HTTP GET query and perform a lookup in dialed digit database 315 to determine if an entry matches the received MCC, MNC, and dialed digit pattern. When there is no matching entry in dialed digit database 315, dialed digit filter 310 may transmit a 404 Not Found message to core devices 155 (730). Core devices 155 may forward the 404 Not Found message to UE device 190 (740) indicating that the dialed digit pattern is not in dialed digit database 315 and the call may continue as dialed. UE device 190 may send an acknowledgement (ACK) message to core devices 155 indicating that UE device 190 has received the 404 Not Found Message (750) and core devices 155 may forward the ACK message to dialed digit filter 310 (760).

Based on receiving the 404 Not Found message, DDCC 302 may take no action and UE device 190 may proceed with the originated call by sending a SIP INVITE message to core devices 155 (770). In one implementation, UE device 190 may additionally proceed with the call by sending the SIP INVITE message to core devices 155 if the client timer expires before receiving a response from dialed digit filter 310. For example, if there is a delay in receiving a response from dialed digit filter 310, UE device 190 may proceed with the call without waiting for a response. In this way, UE device 190 may not remain in an idle or waiting state for more than a predetermined amount of time while continuing to wait for a response from dialed digit filter 310.

Figure 8:
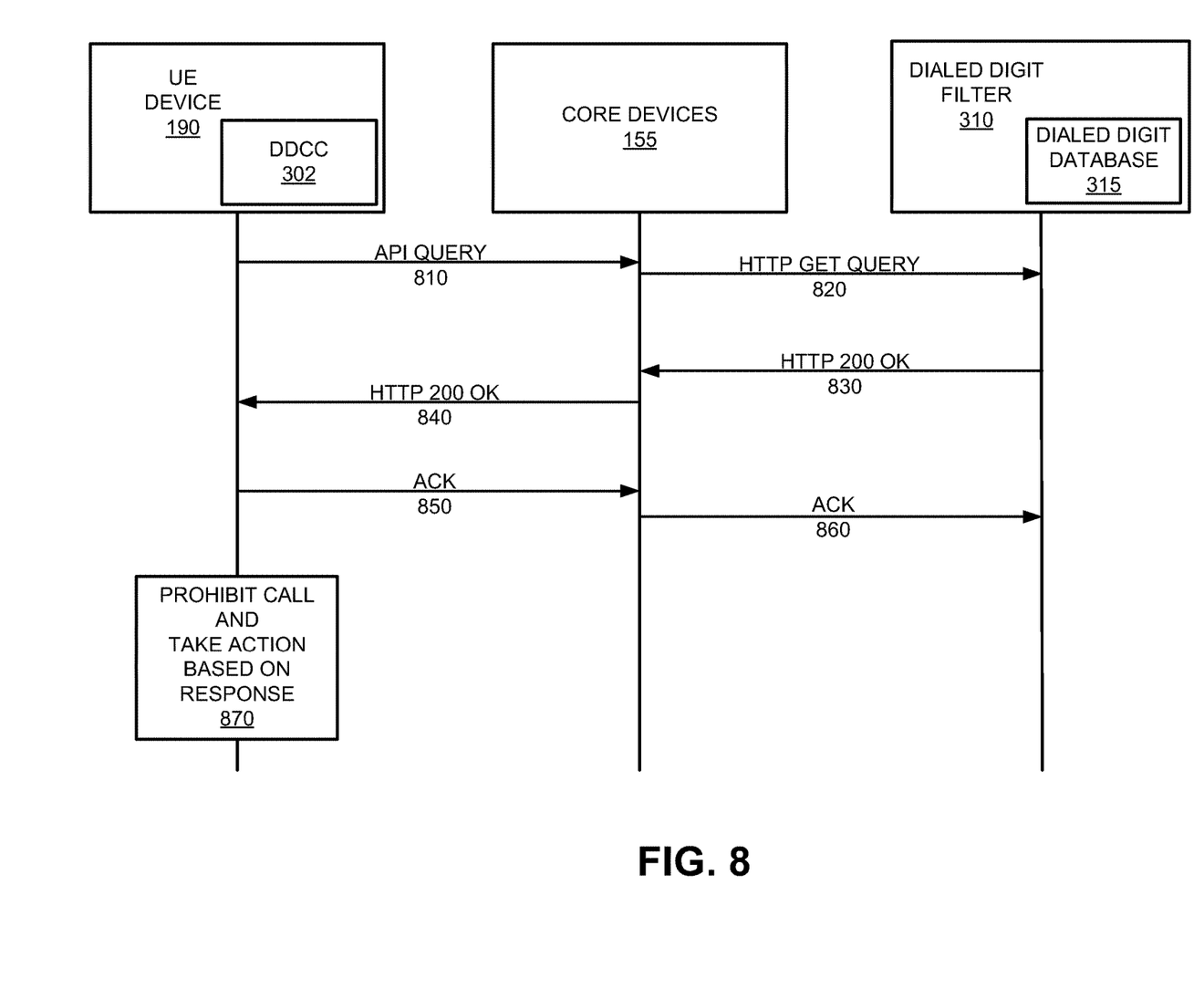
FIG. 8 is a diagram illustrating exemplary communications for prohibiting a call from proceeding based on determining dialed digits are in a dialed digit database, according to an implementation described herein.

FIG. 8 is a diagram illustrating exemplary communications for prohibiting a call from proceeding based on determining a dialed digit is in dialed digit database 315. FIG. 8 may include UE device 190, core devices 155, and dialed digit filter 310.

Communications in FIG. 8 may begin with UE device 190 sending an API query to core devices 155 including a dialed digit pattern and the MCC and MNC of UE device 190 (810). For example, similar to the method described above with respect to FIG. 7, DDCC 302 on UE device 190 may intercept the digits dialed by UE device 190 (i.e., when the dialed digits do not correspond to an emergency number) and transmit the API query (e.g., HTTP GET query) to core devices 155. Core devices 155 may forward the HTTP GET query to dialed digit filter 310 (820).

In the example, shown in FIG. 8, dialed digit filter 310 may determine that an entry matching the received MCC, MNC, and dialed digits exists in dialed digit database 315. Dialed digit filter 310 may respond with an HTTP 200 OK message indicating that the dialed digits have been identified in dialed digit database 315 (830). The HTTP 200 OK message may include a status and an action associated with the dialed digits. For example, if the status of the dialed digit pattern is blocked and the action indicates that announcement #1 should be played, the HTTP 200 OK response may include: {"status": "blocked", "action": "playback announcement #1"}. Core devices 155 may forward the HTTP 200 OK message to UE device 190 (840).

UE device 190 may receive the HTTP 200 OK message and may transmit an ACK message to core devices 155 (850), which forward the ACK message to dialed digit filter 310 (860). UE device 190 may play the announcement indicated by the HTTP 200 OK response (870). Based on the example given above, UE device 190 may obtain and play the locally-stored message corresponding to announcement #1. UE device 190 may additionally prohibit the call using the dialed digits to continue.

Figure 9:
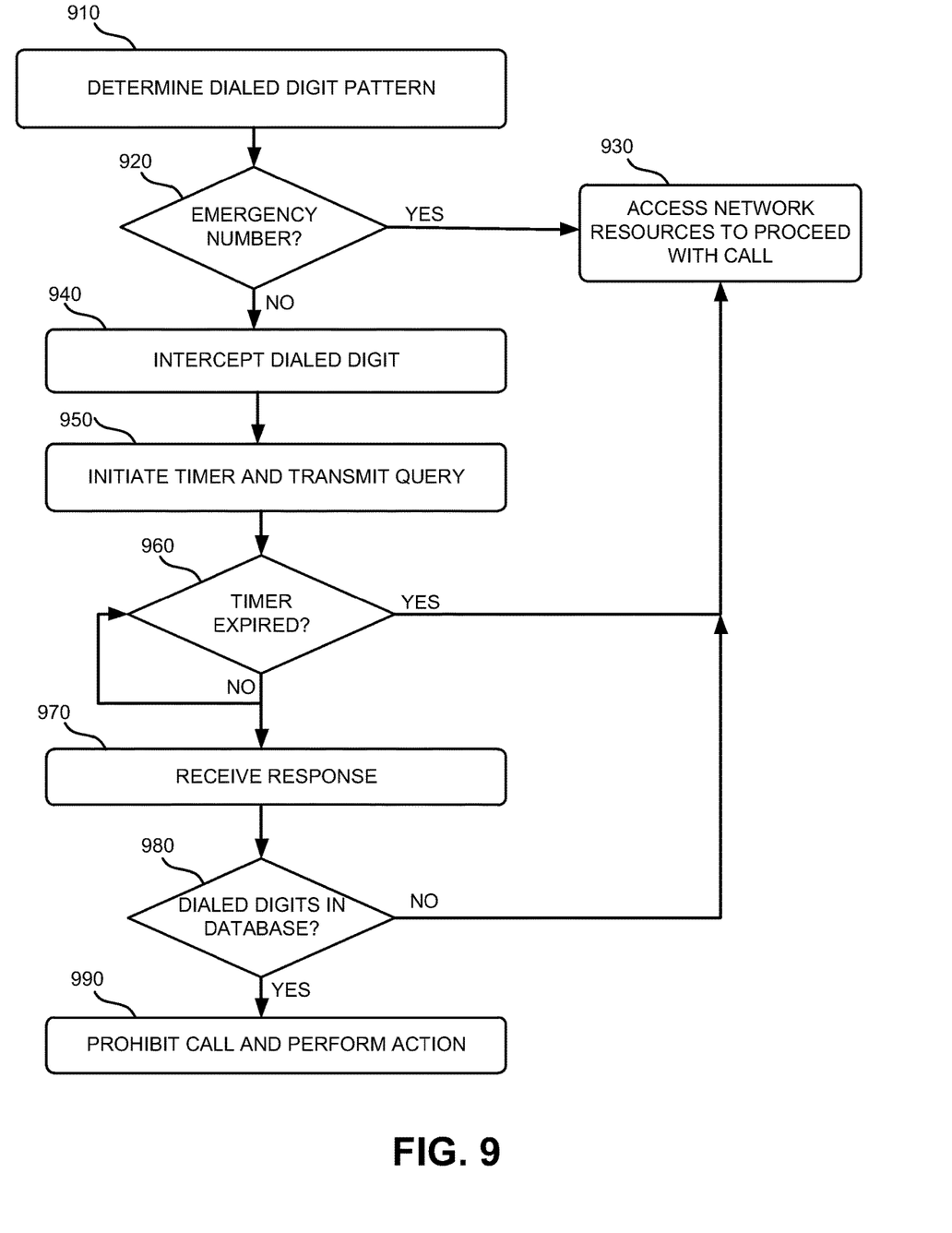
FIG. 9 is a flow diagram illustrating an exemplary method of determining whether to continue a call using network resources based on a dialed digit pattern, according to an implementation described herein.

FIG. 9 is a flow diagram illustrating an exemplary method of determining whether to continue a call using network resources based on a dialed digit pattern. The method of FIG. 9 may be performed, for example, by UE device 190, core devices 155, dialed digit filter 310, and additional or different elements of environment 100.

Processing may begin by determining a digit pattern that has been dialed by UE device 190 (block 910). For example, a user may dial a digit pattern (e.g., telephone number) on a phone dialer or keypad of UE device 190 in order to place a call. UE device 190 may determine whether the digit pattern corresponds to an emergency number (block 920). For example, UE device 190 may determine whether the digit pattern is 9-1-1 or another digit pattern that initiates an emergency phone call. If the dialed pattern is an emergency number (block 920—YES), UE device 190 may access network resources to proceed with completing the call (block 930). In order to place an emergency call quickly, DDCC 302 may not be triggered for determining whether the call should continue.

If the dialed pattern is not an emergency number (block 920—NO), DDCC 302 stored on UE device 190 may be triggered and DDCC 302 may intercept the dialed digits (block 940). DDCC 302 may initiate a client timer and may transmit a query including the dialed digit pattern to dialed digit filter 310 (block 950). DDCC 302 may initiate the client timer to ensure that UE device 190 does not wait more than a predetermined amount of time for a response from dialed digit filter 310 before continuing with the phone call. The query may be an API query (e.g., an HTTP GET query) that includes the dialed digits as well as the MCC and MNC associated with UE device 190. The query may request a status and action associated with the dialed digits.

UE device 190 may determine whether the timer has expired (block 960). If the timer has expired (block 960—YES), UE device 190 may proceed to continue with the call using network resources (block 930). In this way, UE device 190 may not remain in a waiting state for more than a predetermined amount of time before placing the call if UE device 190 does not receive a response from dialed digit filter 310. If the timer has not expired (block 960—NO), UE device 190 may receive a response from dialed digit filter 310 (block 970). The response may include a status and action associated with the dialed digits. In one implementation, DDCC 302 may cache the status and/or action for a period of time. In this way, DDCC 302 may identify a status of a number of the dialed digits (e.g., telephone numbers) in the future locally without querying dialed digit filter 310. This may save additional processing time and resources associated with calls that cannot be completed.

DDCC 302 may determine whether the response indicates that the dialed digits are in dialed digit database 315 (block 980). In one implementation, the response may be an HTTP response (e.g., an HTTP 404 Not Found message) that indicates that the dialed digits were not identified in dialed digit database 315. In another implementation, the response may be an HTTP response (e.g., an HTTP 200 OK message) that indicates that the dialed digits were identified in dialed digit database 315 in addition to a status and action associated with the dialed digits. For example, the status may indicate that the dialed digits are blocked, invalid, fraudulent, etc. In addition, the action may indicate an identifier of an announcement stored on UE device 190 that should be played.

If the response indicates that the dialed digits were not identified in dialed digit database 315 (block 980—NO), UE device 190 may proceed with the call utilizing network resources (block 930). For example, DDCC 302 may send the dialed digits to a SIP client to continue the call origination. If the response indicates that the dialed digits were identified in dialed digit database 315 (block 980—YES), DDCC 302 may prohibit the call from proceeding using network resources and may perform the action indicated in the response (block 990). For example, DDCC 302 may play the announcement that is stored in local memory and is identified in the response. The announcement may indicate the status of the dialed digits and/or actions to take by the user.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 9, and series of signal flows have been described with respect to FIGS. 3, 4, 7, and 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a user device, comprising:
   determining that a digit pattern has been input on the user device to initiate a call;
   transmitting the digit pattern to a device that stores a list of digit patterns to which calls are not to be completed;
   receiving from the device, data that indicates whether the digit pattern is on the list of digit patterns;
   prohibiting the call from being initiated via a network when the received data indicates that the digit pattern is on the list of digit patterns; and
   initiating the call via the network when the received data indicates that the digit pattern is not on the list of digit patterns.

2. The method of claim 1, wherein the user device stores a plurality of announcements associated with respective identifiers, wherein the received data includes an identifier of the respective identifiers when the data indicates that the digit pattern is on the list of digit patterns, and wherein the method further comprises:
   playing one of the announcements when the data indicates that the digit pattern is on the list of digit patterns, wherein the one of the announcements is associated with the identifier included in the received data.

3. The method of claim 1, further comprising:
   initiating a timer when transmitting the digit pattern to the device; and
   initiating the call via the network when the timer expires.

4. The method of claim 1, wherein determining that the digit pattern has been input further comprises determining that the digit pattern does not correspond to an emergency call.

5. The method of claim 1, wherein transmitting the digit pattern further comprises:
   transmitting a mobile country code (MCC) and a mobile network code (MNC) to the device.

6. The method of claim 1, further comprising:
   storing the digit pattern and an indication of whether the digit pattern is on the list of digit patterns at the user device.

7. The method of claim 1, wherein the device is accessible by a plurality of service providers that opt in to use services provided by the device.

8. A user device comprising:
   one or more processors configured to:
      determine that a digit pattern has been input to initiate a call;
      transmit the digit pattern to a device that stores a list of digit patterns to which calls are not to be completed;
      receive, from the device, data, wherein the data indicates whether the digit pattern is on the list of digit patterns;
      prohibit the call from being initiated with a network when the received data indicates that the digit pattern is on the list of digit patterns; and
      initiate the call via the network when the received data indicates that the digit pattern is not on the list of digit patterns.

9. The user device of claim 8, further comprising:
   a memory configured to store a plurality of announcements associated with respective identifiers,
   wherein the received data includes an identifier of the respective identifiers when the data indicates that the digit pattern is on the list of digit patterns, and wherein the one or more processors are further configured to:
      play one of the announcements when the data indicates that the digit pattern is on the list of digit patterns, wherein the one of the announcements is associated with the identifier included in the received data.

10. The user device of claim 8, wherein the one or more processors are further configured to:
    initiate a timer when transmitting the digit pattern to the device; and
    initiate the call with the network when the timer expires.

11. The user device of claim 8, wherein, when determining that the digit pattern has been input, the one or more processors are further configured to determine that the digit pattern does not correspond to an emergency call.

12. The user device of claim 8, wherein, when transmitting the digit pattern, the one or more processors are further configured to:
    transmit a mobile country code (MCC) and a mobile network code (MNC) to the device.

13. The user device of claim 8, wherein the one or more processors are further configured to:
    store the digit pattern and the indication of whether the digit pattern is on the list of digit patterns.

14. The user device of claim 8, wherein the device is accessible by a plurality of service providers that opt in to use services provided by the device.

15. A non-transitory computer-readable memory device storing instructions executable by a processor of a user device, the instructions comprising:
    one or more instructions that, when executed, cause the processor to:

determine that a digit pattern has been input to initiate a call;
transmit the digit pattern to a device that stores a list of digit patterns to which calls are not to be completed;
receive, from the device, data, wherein the data indicates whether the digit pattern is on the list of digit patterns;
prohibit the call from being initiated with a network when the received data indicates that the digit pattern is on the list of digit patterns; and
initiate the call via the network when the received data indicates that the digit pattern is not on the list of digit patterns.

16. The non-transitory computer-readable memory device of claim 15, wherein the user device stores a plurality of announcements associated with respective identifiers,
wherein the received data includes an identifier of the respective identifiers when the data indicates that the digit pattern is on the list of digit patterns, and wherein the one or more instructions further comprise one or more instructions that cause the processor to:
play one of the announcements when the data indicates that the digit pattern is on the list of digit patterns, wherein the one of the announcements is associated with the identifier included in the received data.

17. The non-transitory computer-readable memory device of claim 15, wherein the instructions further comprise one or more instructions that cause the processor to:
initiate a timer when transmitting the digit pattern to the device; and
initiate the call with the network when the timer expires.

18. The non-transitory computer-readable memory device of claim 15, wherein the one or more instructions that cause the processor to determine that the digit pattern has been input comprise one or more instructions that cause the processor to determine that the digit pattern does not correspond to an emergency call.

19. The non-transitory computer-readable memory device of claim 15, wherein the one or more instructions that cause the processor to transmit the digit pattern comprise one or more instructions that cause the processor to:
transmit a mobile country code (MCC) and a mobile network code (MNC) to the device.

20. The non-transitory computer-readable memory device of claim 15, wherein the instructions further comprise one or more instructions that cause the processor to:
store the digit pattern and the indication of whether the digit pattern is on the list of digit patterns.

\* \* \* \* \*